Aug. 9, 1949.  C. D. SKINNER  2,478,719
REFRIGERATOR HAVING MEANS FOR MAINTAINING THE
PRESSURE IN THE STORAGE CHAMBER
ABOVE ATMOSPHERIC
Filed Sept. 27, 1945  2 Sheets-Sheet 1
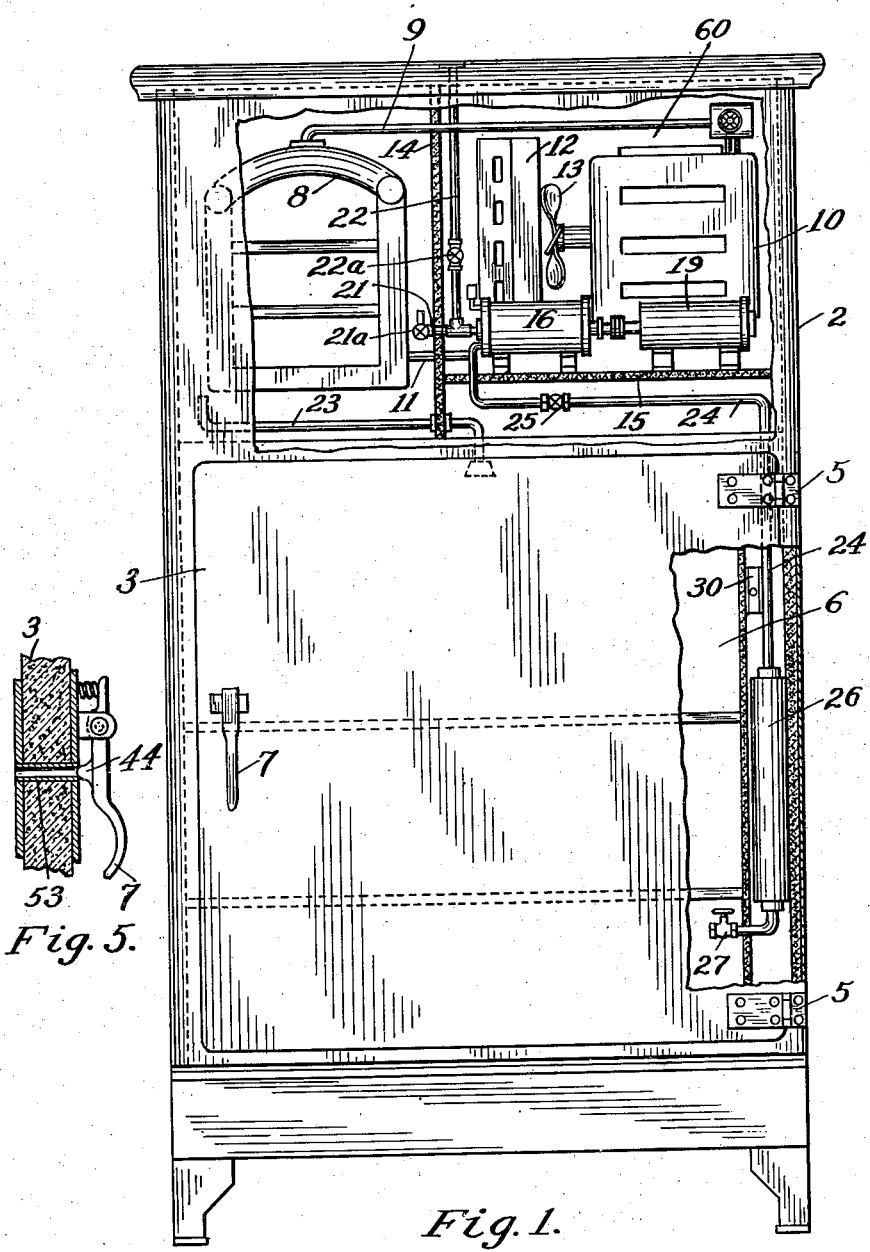
Fig. 5.
Fig. 1.
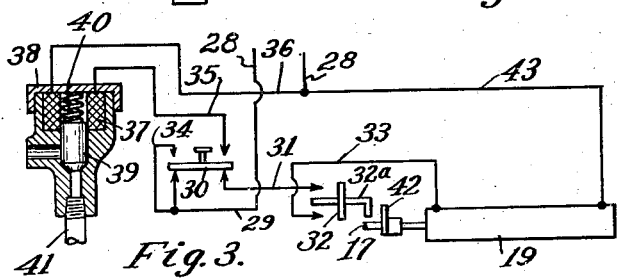
Fig. 3.
INVENTOR
Chame D. Skinner
by Christy, Parmelee and
Strickland
his attorneys Aug. 9, 1949.  C. D. SKINNER  2,478,719
REFRIGERATOR HAVING MEANS FOR MAINTAINING THE
PRESSURE IN THE STORAGE CHAMBER
ABOVE ATMOSPHERIC
Filed Sept. 27, 1945  2 Sheets-Sheet 2

INVENTOR
Chame D. Skinner
by Christy, Parmelee & Strickland
his attorneys

Patented Aug. 9, 1949

2,478,719

UNITED STATES PATENT OFFICE 2,478,719

REFRIGERATOR HAVING MEANS FOR MAINTAINING THE PRESSURE IN THE STORAGE CHAMBER ABOVE ATMOSPHERIC

Chame D. Skinner, Wilkinsburg, Pa.

Application September 27, 1945, Serial No. 618,901

15 Claims. (Cl. 62—89)

My invention relates to refrigeration, and is directed to the problem of inhibiting the loss of moisture from the foodstuffs or other materials under refrigeration. The invention consists in improvements both in method and in apparatus.

The invention will be described as it applies to the well-known types of domestic refrigerators for the preservation of foodstuffs, with the understanding that the invention may be applied to commercial refrigerators, cold rooms, cold storage buildings and cars, and to other installations and structures in which foods or other materials are preserved at temperatures below normal or room temperature.

When the door of the conventional home refrigerator is opened, as it is from time to time in service, there is an outrush of cold air from adjacent the bottom of the doorway of the refrigerator chamber, and a corresponding inrush of warm air at the top of the doorway, whereby, when the door is closed again, there is trapped in the refrigerator a quantity of warm air. This warm air is soon chilled under the effect of the evaporator or heat-absorbing unit of the refrigerating mechanism, and under the effect of such chilling the air decreases in volume, while a substantial part of the water vapor contained therein is condensed and/or precipitated in the form of frost and ice upon the heat-absorbing unit. Accordingly, within the refrigerator chamber the pressure and humidity of the atmosphere are reduced, thus augmenting the capacity of the air to absorb moisture from the foodstuffs exposed thereto.

In accordance with my invention, I compress the atmosphere within the refrigerator chamber to a pressure above normal, that is, to a pressure above natural atmospheric pressure, and, by maintaining the refrigerated atmosphere at such super-normal pressure, I have found that the loss of moisture from the stored foodstuffs is greatly reduced, and that the foodstuffs may be preserved in the desired condition for remarkably greater intervals of time than heretofore. The need for humidifying the air within the refrigerator chamber, or within a special compartment thereof, is eliminated, although in some cases humidification of the air may be practiced, if desired.

As an example of the good results I have obtained, I may cite the demonstration made in the preservation of lettuce, a difficult item of produce to keep in fresh and edible condition, it being understood that, when stored in the ordinary refrigerator, lettuce becomes wilted and dried in a matter of a few days or a week. In the practice of my invention I have preserved lettuce for over three weeks in substantially the same condition as it was when placed in the refrigerator.

While there are untold fields of utility for the improvements of my invention, I may particularly mention the advantages realized by minimizing moisture losses in the case of refrigerated meats. By reducing the loss of moisture from meats in the packing houses and in the meat dealer's cold rooms, I not only prevent the partial loss of flavor, food value and quality of the meat, but I prevent wastage, in consequence of which the packer or dealer has available for sale fewer pounds of meat than he actually purchases and stores. The advantages of conserving the natural moisture of meats (or of other materials to be preserved) are manifold, and the many instances in which the method and apparatus of this invention will prove useful and valuable need not be further elaborated herein.

The invention will be understood upon reference to the accompanying drawings, wherein I show in exemplary way a refrigerator structure in which and in the operation of which the invention may be enjoyed.

Fig. 1 is a view in front elevation of a typical domestic refrigerator, with portions of the cabinet walls and door broken away to reveal the organization of apparatus of the invention therein;

Fig. 3 is a wiring diagram of the electrically energized elements of the apparatus;

Fig. 5 is a fragmentary detail view of the door handle of the refrigerator, indicating in association therewith a certain pressure-relieving device.

Figure 2:
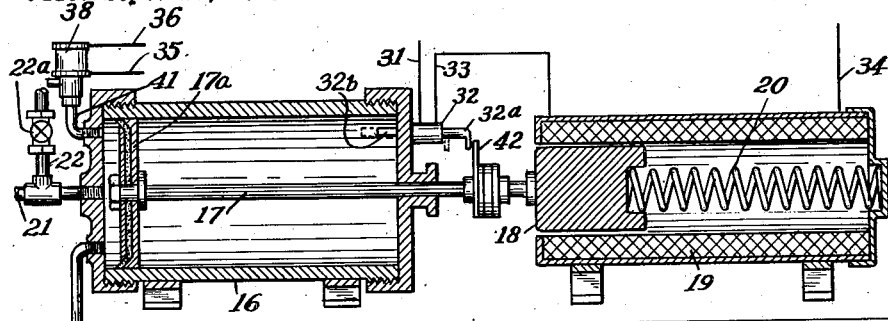
Fig. 2 is a view to larger scale of certain of the essential elements of the apparatus of Fig. 1, the view of Fig. 2 being shown partly in side elevation and partly in vertical section.

Referring to Fig. 1 of the drawings, the reference numeral 2 is applied to the refrigerator cabinet, 3 to the door, hinged to the cabinet at 5, and secured in position closing the chamber 6 within the cabinet, by means of any conventional door-latching mechanism, operated by a handle 7. The walls and door of the cabinet are of the usual heat-insulating construction. The particular type of mechanism for refrigerating the chamber 6 is not a matter of concern respecting this invention, and for purposes of example I show a known sort of mechanism including a heat-absorbing unit or evaporator in the form of a shelved receptacle 8 for ice trays. The walls of the receptacle 8 comprise a system of small passages or ducts into which compressed or liquid refrigerant is delivered through a pipe 11 leading from a condenser 12, cooled by a fan 13, and within such passages or ducts the refrigerant expands or evaporates, with the consequent absorption of heat from the atmosphere within the chamber 6. The spent refrigerant flows by a return line 9 to a motor-driven compressor 10, wherein it is compressed and fed to the condenser 12 by a pipe which does not appear in the drawings. The condenser 12 and compressor 10 of the refrigerating mechanism are contained in a compartment 60, partitioned by insulated walls 14 and 15 from the refrigerated chamber or chambers 6 within the cabinet, and in operation it will be understood that such mechanism, under the control of the usual adjustable thermostatic devices (not shown), operates automatically to maintain the temperature within the chamber 6 at predetermined value below normal (room) temperature.

In accordance with the invention, the natural atmospheric air in the chamber 6 is confined when the door 3 is closed, and this confined body of air is compressed, by the injection thereinto of compressed air. The injection of compressed air into the atmosphere within the chamber 6 is effected in a manner and at a rate required to establish and maintain the atmosphere within such chamber at a pressure above the normal or natural pressure of the outer atmosphere, and the extent or degree of such pressure above normal value need be only slight, a fraction of an inch of water pressure having been found very effective, although higher pressures, preferably less than one atmosphere above normal atmospheric pressure, may be used as and if required.

Referring to Figs. 1, 2 and 3, the means for injecting compressed air into the chamber 6 comprise a reciprocating pump or compressor 16, whose plunger 17, equipped with a piston 17a, is connected to the armature 18 of an electromagnet 19. A spring 20 is arranged to drive the plunger through its right-to-left or air-compressing stroke, and the electro-magnet is energized to move the plunger through its left-to-right or air intake stroke. The pump 16 and its motor 18, 19 are shown to be arranged in the unrefrigerated compartment 60 of the structure, but this is only a matter of convenience. Preferably, the air pump will be located in a refrigerated zone within the cabinet.

The air intake of the pump consists in a branched pipe, the main branch 21 including a check valve 21a, and the auxiliary branch 22 a check valve 22a. Advantageously, but not necessarily, the main branch 21 opens adjacent to the heat-absorbing unit 8, whereby the air drawn into the pump is cold air. It will be noted that, if other communication is not existent between the chamber 6 and the main inlet branch of the pump, a duct 23 will be provided to admit refrigerated air from chamber 6 to a point adjacent the heat-absorbing unit, as shown in Fig. 1. The auxiliary inlet branch 22 of the pump leads from the atmosphere outside of the chamber 6. The passages for the inflow of air through the two check valves 21a and 22a are so proportioned that the greatest part of the air drawn into the pump is taken from the refrigerated atmosphere within the cabinet, while the relatively small quantity of air drawn from the outer atmosphere is sufficient to make-up the volume of air lost by the contraction of the warm air admitted to the refrigerator when the refrigerator door is opened, and trapped therein when the door is closed again, plus any air which may be lost by such leakage as may occur around the door while the door is closed. The introduction of this make-up air through the auxiliary branch inlet 22 permits the pump to deliver sufficient compressed air through a delivery line 24 to establish and maintain the specified atmospheric pressure conditions within the chamber 6. The delivery line 24 includes a check valve 25 which closes during the intake stroke of the pump, but opens during the delivery stroke. The delivery line includes a receiver 26, from which the compressed air is delivered through a needle valve 27 into the chamber 6, the needle valve being adjustable to regulate the rate of delivery of compressed air into the said chamber 6. The pressure established and maintained in the chamber 6 is determined by the strength of the spring 20 that drives the pump plunger through its air-compressing stroke. Manifestly, the pressure in the chamber 6 cannot exceed the pressure of the compressed air delivered by the pump, and the pressure of the compressed air delivered by the pump cannot exceed the pressure created by the spring that drives the plunger 17. The desired air pressure in the chamber 6 is thus determined by the spring, and a spring of such strength is selected as will give the desired air pressure for the particular refrigerator installation.

In the operation of the apparatus, the electro-magnet 19 is energized by a circuit connected to an electric supply 28, such circuit comprising, as shown in Fig. 3, a circuit wire 29 leading from the electric supply through a door switch 30, line 31, reversing switch 32 and a line 33 to one terminal of the electromagnet, and a line 43 leading from the electric supply to the other terminal of the electro-magnet. The door switch 30 is arranged at the hinged side of the door (see Fig. 1), and so long as the door 3 is closed the switch serves electrically to unite the circuit lines 29 and 31, but when the door is opened the switch 30 interrupts the electrical continuity of lines 29 and 31, and interconnects circuit wires 34 and 35 which, together with a circuit wire 36 connects the coil 37 of a magnetic relief valve 38 to the electric supply 28. For the present it will be noted that the relief valve includes a valve element 39 that is normally held to its seat by a spring 40, to blank flow through a vent pipe 41 opening from the discharge end of the pump 16. So long as the refrigerator door remains closed, the relief valve circuit stands open at the door switch 30, and the circuit lines 29 and 31 of the electro-magnet 19 remain electrically united, wherefore the energizing circuit of the electromagnet is subject to the reversing switch 32. Under such conditions the operation is as follows:

As the spring 20 drives the plunger 17 through its discharge (right-to-left) stroke, the reversing switch 32 stands in circuit-interrupting position, but as the plunger approaches the end of such stroke a finger 42 on the plunger engages the switch arm 32a of the reversing switch and throws the switch into the circuit-closing position indicated by dotted lines in Fig. 2, thus immediately closing the energizing circuit of the electro-magnet. The armature of the magnet and the pump plunger are shifted in left-to-right direction, compressing the spring 20 and drawing a charge of air into the pump cylinder. Upon approaching the end of the intake stroke the piston 17a on plunger 17 engages the left-hand end 32b of the switch arm 32a, which projects into cylinder 16, as shown in Fig. 2, and shifts it into the circuit-interrupting position shown in full-lines, thereby de-energizing the electro-magnet and releasing the plunger to the force of the compressed spring 20.

While the plunger is being moved through its intake stroke, the check valve 25 is closed and the check valves 21a and 22a are open, but as soon as the plunger begins the discharge stroke the latter check valves close and the check valve 25 opens, and air is delivered through line 24 into the refrigerator chamber 6. The operation of the electro-magnet and pump is repeated automatically, until the pressure in the chamber 6 reaches the desired value, that is, the pressure against which the spring cannot further move the plunger to deliver more air. Thereupon, the movement of the plunger is arrested, with the spring pressing the plunger against the air in the cylinder, which spring pressure in turn is transmitted through the line 24 to the air confined in the chamber 6. The atmosphere in the chamber 6, therefore, is under the pressure of the spring 20, and under such pressure the plunger may move only to the extent necessary to deliver air to replace or make-up such air as may leak from the chamber 6. In this manner the refrigerated atmosphere in the chamber 6 is held at desired pressure above normal value, and the good results described are obtained.

When the door of the refrigerator is opened, the pressure within the chamber 6, of course, instantly drops to the pressure of the outer atmosphere, but before opening the door it is desirable, if not essential, to reduce the pressure within the chamber. To this end, I provide a vent in the wall of the refrigerator, conveniently a vent 53 in the door 3 (Fig. 5); this vent is normally closed by a valve element 64 on the door-latch handle 7, whereby when the handle is manipulated to open the door the vent 53 is uncovered, and the pressure in chamber 6 relieved before the door-latch releases the door. Upon the opening of the door the switch 30 acts to open the electro-magnet circuit and to close the circuit of the relief valve 38. The closing of the relief valve circuit draws the valve element 39 from its seat and vents the pump cylinder to the open air, with the effect that the spring-urged plunger 17 instantly moves to the end of its discharge stroke. The reversing switch 32 is closed at this time, but since the door switch 30 holds the circuit lines 29 and 31 open, the electro-magnet cannot operate. The advantage of so venting the pump cylinder and causing the plunger 17 to move to the starting point of its intake stroke will now appear.

As already noted, when the door of a refrigerator is opened, cold air rushes out through the bottom of the doorway and warm air rushes in through the top, and it is this warm air that is reduced in volume and tends to create an undesirable partial vacuum in the chamber 6 when the refrigerator door is closed. By setting the pump plunger at the start of its intake stroke, and by arranging the inlet end of the air intake line 23 at the top of the chamber 6, no sooner is the door 3 closed, and the switch 30 returned to the position illustrated Fig. 3, than the relief valve closes and the electro-magnet 19 is energized to draw the plunger through an air intake stroke. Thus, the immediate effect is to remove the warm air from the top of the chamber 6, draw it over the surfaces of the heat-absorbing unit 8 and thereby chill it, and then take it into the pump and compress it for delivery in proper condition to the chamber 6. The reciprocation of the pump plunger is relatively fast, until the desired conditions within chamber 6 have been re-established. Thereafter, the operation is relatively slow depending upon the rate of leakage (if any) from the chamber 6. The electrical power cost is practically nil.

The quick removal of the warm air from the atmosphere in the refrigerator chamber 6 is very beneficial.

Figure 4:
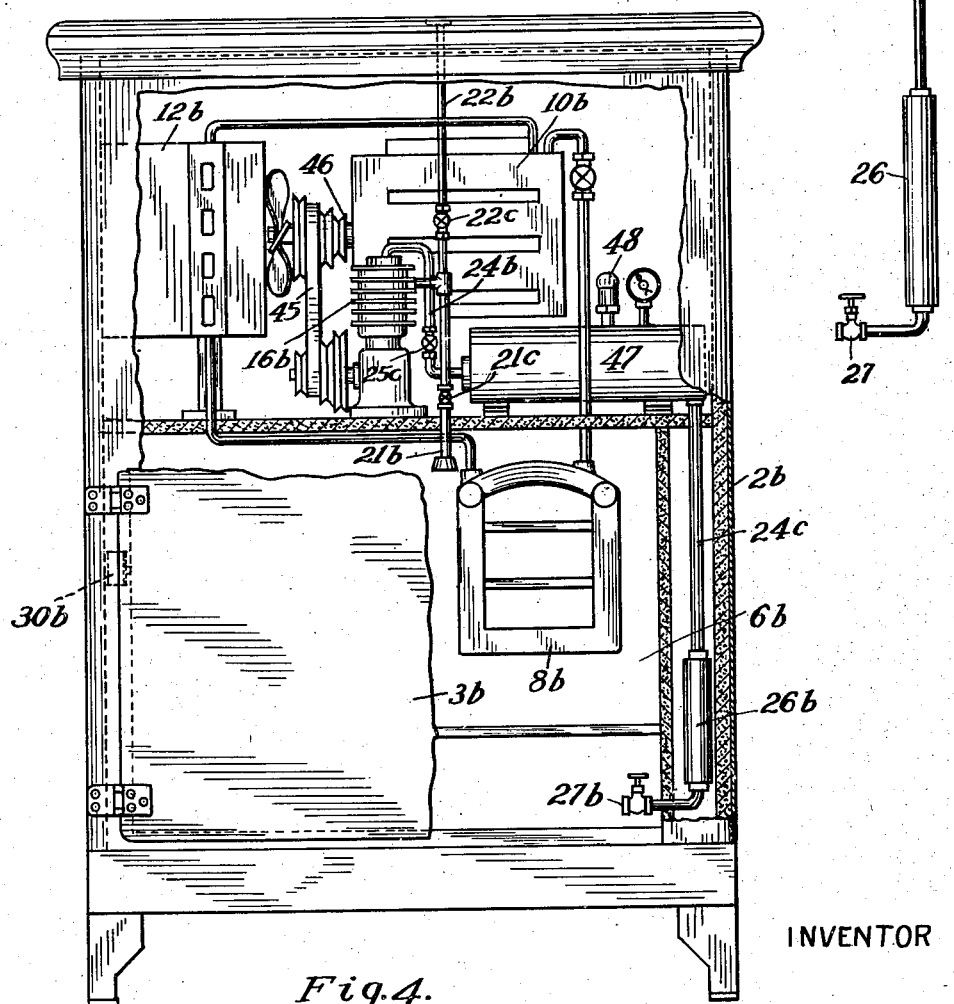
Fig. 4 is a view generally similar to Fig. 1, illustrating a modified form of apparatus of the invention.

In Fig. 4, I illustrate a modified form of the apparatus of the invention. In the refrigerator 2b the heat-absorbing unit 8b is arranged in the refrigerated chamber 6b and the air compressor 16b is of the piston type adapted to be driven by a belt 45 from the motor-driven shaft 46 of the refrigerant compressor 10b. The air compressor 16b operates concurrently with the refrigerant compressor 10b, which is under the automatic control of the usual thermo-static control device (not shown). Save as otherwise mentioned, it will be understood that the broad principle of operation of the apparatus first described will be found in the modified structure. The air intake line for the pump 16b consists in a main branch 24b leading from the chamber 6b, and an auxiliary branch 22b leading from the atmosphere externally of the chamber 6b; the air is delivered from the pump 16b through a discharge line 24b to a supply tank or receiver 47, having a relief valve 48 which is set to open when a predetermined air pressure is reached, thus establishing an upper limit of the pressure to which the air may be compressed, it being recalled that the upper pressure limit to which the air may be compressed in the structure first described is determined by the strength of the spring 20. The branch intakes 24b and 22b are equipped with check valves 21c and 22c, respectively, and the delivery line 24b is provided with a check valve 25c. The injection of the compressed air into the chamber 6b is effected by way of a line 24c leading from tank 47 through a receiver 26b and an adjustable needle valve 27b.

Conveniently, the electric energizing circuit of the motor of the refrigerant compressor 10b includes a door switch 30b, so that the operation of both the refrigerating and air-compressing instrumentalities is arrested when the door 3b is open.

In the operation of the modified apparatus of Fig. 4, as well as in the operation of the first described apparatus, the method of the invention is realized.

The structures described are exemplary of the presently preferred embodiment of the invention, but it will be understood that within the terms of the appended claims many variations and modifications may be made, without departing from the spirit of the invention.

I claim:

1. The method of inhibiting the loss of moisture from material stored under a sub-normal temperature in a mechanically refrigerated chamber having an access door which is opened and closed from time to time, which method comprises confining against escape the body of natural atmospheric air existing in said chamber when said door is closed, and automatically compressing and injecting natural atmospheric air into said confined body to establish and substantially maintain said body of air under pressure above normal atmospheric pressure.

2. The method of inhibiting the loss of moisture from material stored under a sub-normal temperature in a mechanically refrigerated chamber having an access door which is opened and closed from time to time, which method comprises confining against escape the body of natural atmospheric air existing in said chamber each time that the door is closed, and automatically injecting compressed air into said confined body to establish and substantially maintain said body of air under a pressure of less than one atmosphere above normal atmospheric pressure.

3. The method of claim 1, in which the air is drawn from the outer atmosphere and automatically compressed for injection into said confined body of air.

4. Refrigerating apparatus comprising a storage chamber and mechanism for refrigerating said chamber, in combination with an air-compressing mechanism having an inlet in communication with the air in said chamber and with the air in the outer atmosphere, and means for delivering compressed air from said mechanism into said chamber, whereby the atmosphere in said chamber may be substantially held at a pressure above normal value, said air-compressing mechanism comprising a reciprocating pump, a spring for driving the plunger of said pump in one direction of its range of reciprocation and an electro-magnet for driving it in opposite direction, an electric supply circuit, and a reversing switch for closing said circuit with said electro-magnet when the reciprocable plunger approaches one end of its range of reciprocation and opening said circuit when the plunger approaches the opposite end of its range of reciprocation.

5. Refrigerating apparatus comprising a storage chamber and mechanism for refrigerating said chamber, in combination with an air-compressing mechanism having an inlet in communication with the air in said chamber and with the air in the outer atmosphere, and means for delivering compressed air from said mechanism into said chamber, whereby the atmosphere in said chamber may be substantially held at a pressure above normal value, comprising a reciprocating pump, a spring for driving the plunger of said pump in one direction of its range of reciprocation and an electro-magnet for driving it in opposite direction,, an electric supply circuit, and a reversing switch for alternately opening and closing said circuit with said electro-magnet during plunger reciprocation.

6. Refrigerating apparatus comprising a storage chamber having an access door and mechanism for refrigerating the chamber, in combination with an air-compressing mechanism arranged with means for receiving air from said chamber and from the outer atmosphere, and means for delivering compressed air from said mechanism into said chamber to maintain the atmosphere in said chamber, while the door is closed, at a pressure above normal value, said air-compressing mechanism comprising a reciprocating pump, a spring for driving the pump plunger in its air-compressing stroke, and an electro-magnet having an electric energizing circuit connected thereto for moving said plunger through its intake stroke.

7. Refrigerating apparatus comprising a storage chamber having an access door and mechanism for refrigerating the chamber, in combination with an air-compressing mechanism arranged with means for receiving air from said chamber and from the outer atmosphere, and means for delivering compressed air from said mechanism into said chamber to maintain the atmosphere in said chamber, while the door is closed, at a pressure above normal value, said air-compressing mechanism comprising a reciprocating pump, a spring for driving the pump plunger in its air-compressing stroke, and an electro-magnet having an electric energizing circuit connected thereto for moving said plunger through its intake stroke, together with means for opening said circuit when said door is opened.

8. Refrigerating apparatus comprising a storage chamber having an access door and mechanism for refrigerating the chamber, in combination with an air-compressing mechanism arranged with means for receiving air from said chamber and from the outer atmosphere, and means for delivering compressed air from said mechanism into said chamber to maintain the atmosphere in said chamber, while the door is closed, at a pressure above normal value, said air-compressing mechanism comprising a reciprocating pump, a spring for driving the pump plunger in its air-compressing stroke, and an electro-magnet having an electric energizing circuit connected thereto for moving said plunger through its intake stroke, together with means for opening said circuit and venting the pump when said door is opened.

9. In apparatus for the preservation of food containing moisture, the combination with a thermally insulated food storage chamber and means for refrigerating said chamber and its contents, of means for conserving the moisture content of the stored food comprising passages for drawing air from the atmosphere in said chamber and from the atmosphere externally of said chamber, and a compressor for delivering such air into said chamber at a pressure above normal.

10. Apparatus for the preservation of food containing moisture comprising a thermally insulated chamber, means in said chamber for supporting the food to be preserved, a heat-absorbing unit in said chamber, means arranged externally of said chamber and connected to said unit for effecting the removal of heat from the unit; in combination with means for retarding the evaporation of moisture from the stored food comprising passages for leading air from points within and without said chamber, and means for delivering such air into said chamber at a pressure above normal.

11. Refrigerating apparatus comprising a storage chamber having an access door and mechanism for refrigerating the chamber, in combination with an air-compressing mechanism arranged with means for receiving air from said chamber and from the outer atmosphere, and means for delivering compressed air from said mechanism into said chamber to maintain the atmosphere in said chamber, while the door is closed, at a pressure above normal value, said air-compressing mechanism comprising a reciprocating pump, a spring for driving the pump plunger in its air-compressing stroke, and an electro-magnet having an electric energizing circuit connected thereto for moving said plunger through its intake stroke, together with means for opening said circuit and venting the pump when said door is opened, an electric motor connected to drive said compressor, an electric energizing circuit for said motor, and means for interrupting the energizing circuit for said motor when the chamber is opened.

12. In apparatus for the preservation of material containing moisture, the combination with a thermally insulated substantially hermetic material storage chamber and means for refrigerating said chamber and its contents, of means for conserving the moisture content of the stored material comprising apparatus for compressing and delivering natural atmospheric air at regulated pressure into said chamber for establishing in the refrigerated atmosphere therein a pressure above normal, a door to give access to said chamber, a motor connected to drive said compressor, and means for intermitting the energizing of said motor when said door is open.

13. In apparatus for the preservation of food containing moisture, the combination with a thermally insulated food storage chamber and means for refrigerating said chamber and its contents, of means for conserving the moisture content of the stored food comprising a compressor for delivering air into said chamber for establishing in the refrigerated atmosphere therein a pressure above normal, an electric motor connected to drive said compressor, an electric energizing circuit for said motor, and switch means for closing said circuit when the atmospheric pressure in said chamber falls below critical value.

14. Refrigerating apparatus comprising a storage chamber having an access door and mechanism for refrigerating the chamber, in combination with an air-compressing mechanism arranged with means for admitting air from said chamber and from the outer atmosphere, and means for delivering compressed air from said compressing mechanism into said chamber to maintain the atmosphere in said chamber, while the door is closed, at pressure above normal value, and means for bleeding the compressed air from said compressing mechanism when said door is opened.

15. Refrigerating apparatus comprising a storage chamber having an access door and mechanism for refrigerating the chamber, in combination with an air-compressing mechanism arranged with means for admitting air from said chamber and from the outer atmosphere, means for delivering compressed air from said compressing mechanism into said chamber to maintain the atmosphere in said chamber, while the door is closed, at a pressure above normal value, and means for intermitting the operation of said air-compressing mechanism and bleeding compressed air therefrom when said door is opened.

CHAME D. SKINNER.

REFERENCES CITED

The following references are of record in the file of this patent:

UNITED STATES PATENTS

| Number | Name | Date |
|---|---|---|
| 1,796,828 | Clingman | Mar. 17, 1931 |
| 1,947,223 | Ophuls | Feb. 13, 1934 |
| 2,116,813 | Weisser | May 10, 1938 |
| 2,175,162 | Waterfill | Oct. 3, 1939 |
| 2,345,204 | Lodwig | Mar. 28, 1944 |

FOREIGN PATENTS

| Number | Country | Date |
|---|---|---|
| 521,040 | Germany | Mar. 18, 1931 |